9792X
W. Mix,
Casting Spoons.
Patented June 28, 1836.
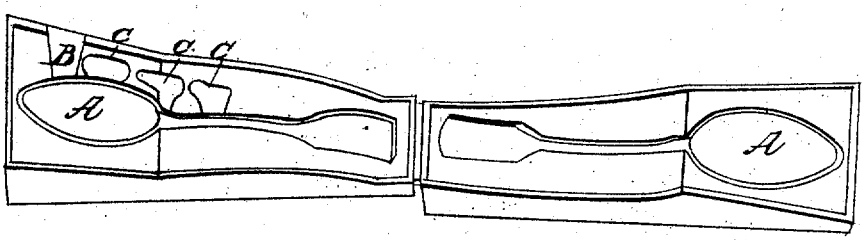

9792X June 28, 1836

William Mix of Prospect, Connecticut.

Letters Patent

The Schedule referred to in these Letters Patent and making part of the same containing a description in the words of the said William Mix himself of his "Improvement in the method of Casting Spoons." —

To whom it may concern:

Be it known that I, William Mix of Prospect in the County of New Haven and State of Connecticut, have invented made and applied to use a new & useful improvement in the method of Casting Spoons of Britania, Block tin or other suitable metal for cast spoons, which improvement consists in the peculiar construction of the mould for casting them, which I call "Mix's improved Spoon Mould", and I specify my improvement as follows. The is mould like those heretofore used may be made of cast iron or Brass, or of Composition metal in two parts leaving the impression for the spoon between them when put together in the usual manner and my improvement consists in enlarging the orrifice for the Sprue or place for pouring in the metal, so as to extend it about one inch along the upper edge of the bowl of the spoon as it lies in the mould & about the thickness of the bowl where it joins it, but thicker as it rises instead of the narrow but thick orrifice heretofore in use which is usually about one quarter of an inch in diameter at its junction with the spoon & also my improvement consists further in making one or more, usually three excavations for safety spurs rising, in the sides of the mould, above the bed of the spoon, to let off the air and to receive sprues or spurs of metal along the bowl & handle of the spoon which by its weight as the metal settles in the mould by cooling, retain the sink, and will prevent air bubbles or sinks in the casting, & produce a perfect spoon in the mould, These sprues or spurs are thin where they join the spoon & thicker above & are easily broken off. The excavations for these spurs may be made to contain from a quarter to half an ounce of metal more or less according to the size of the mould & casting. The effect of this improvement is that the metal enters the mould with a wider spread than usual which prevents the roughness so common near the sprue in casting & the safety spurs or sprues receiving a mass of the liquid metal, which rises in them & presses upon the casting; prevents sinks and air holes in it which often mar or spoil it. Moulds for all size of large or small spoons are made in the same principle & in the same manner. This mould, as all others should be, is highly polished, where the spoon is cast & needs no coating but simply smoking to ensure perfect castings, which require only burnishing or buffing.

For further illustration reference may be had to the model & drawings of my improvement deposited in the Patent Office.

I claim as my invention & improvement only the inlargement & form of the entrance sprue or orifice for pouring in the metal in the manner as above described, & also the safety spurs or rising excavations for the false sprues as above described & for these improvements only I solicit Letters Patent.

In testimony that the above & foregoing contains a full & exact description of my said improvement I hereunto subscribe my name this 27th day of February 1836.

Witnesses }
Ezra? Linson Baldwin }
M R. Baldwin }

William Mix
[illegible]

(Patented 28th June 1836)